No. 892,394. PATENTED JULY 7, 1908.
W. H. BOUTELL.
FRUIT PARING MACHINE.
APPLICATION FILED MAY 17, 1901. RENEWED SEPT. 12, 1907.
5 SHEETS—SHEET 2.
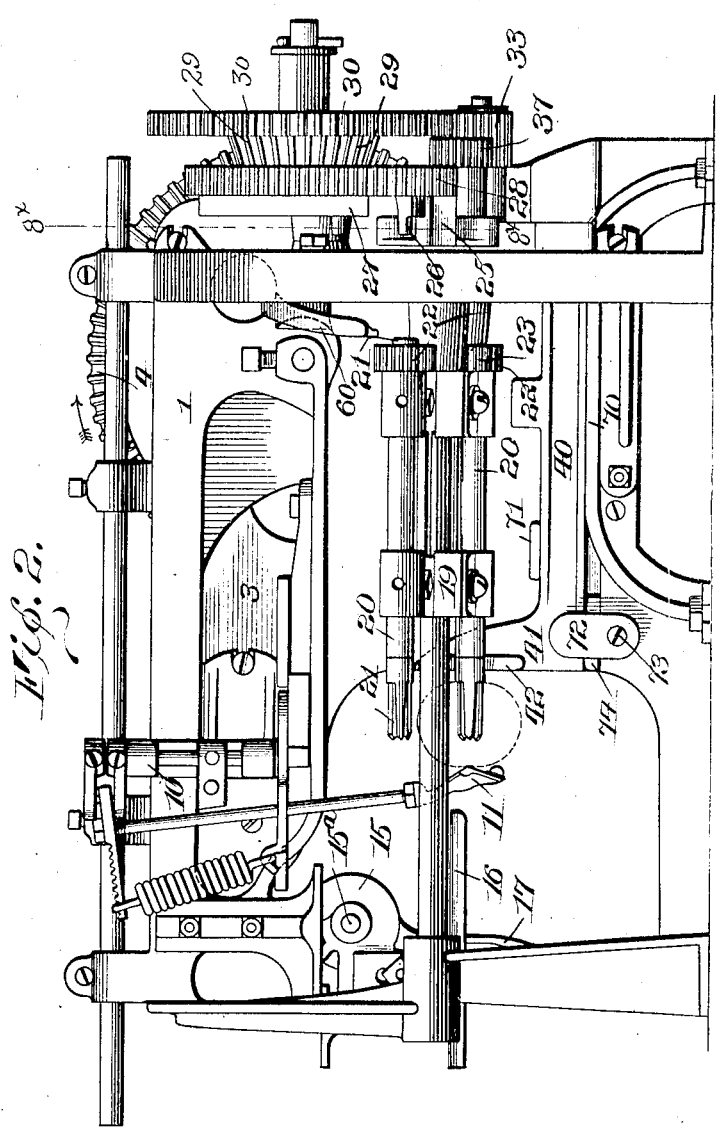
Witnesses.
Walker B. Payne
G. Willard Rich
Inventor.
William H. Boutell
by Frederick H. Church
his Attorney.

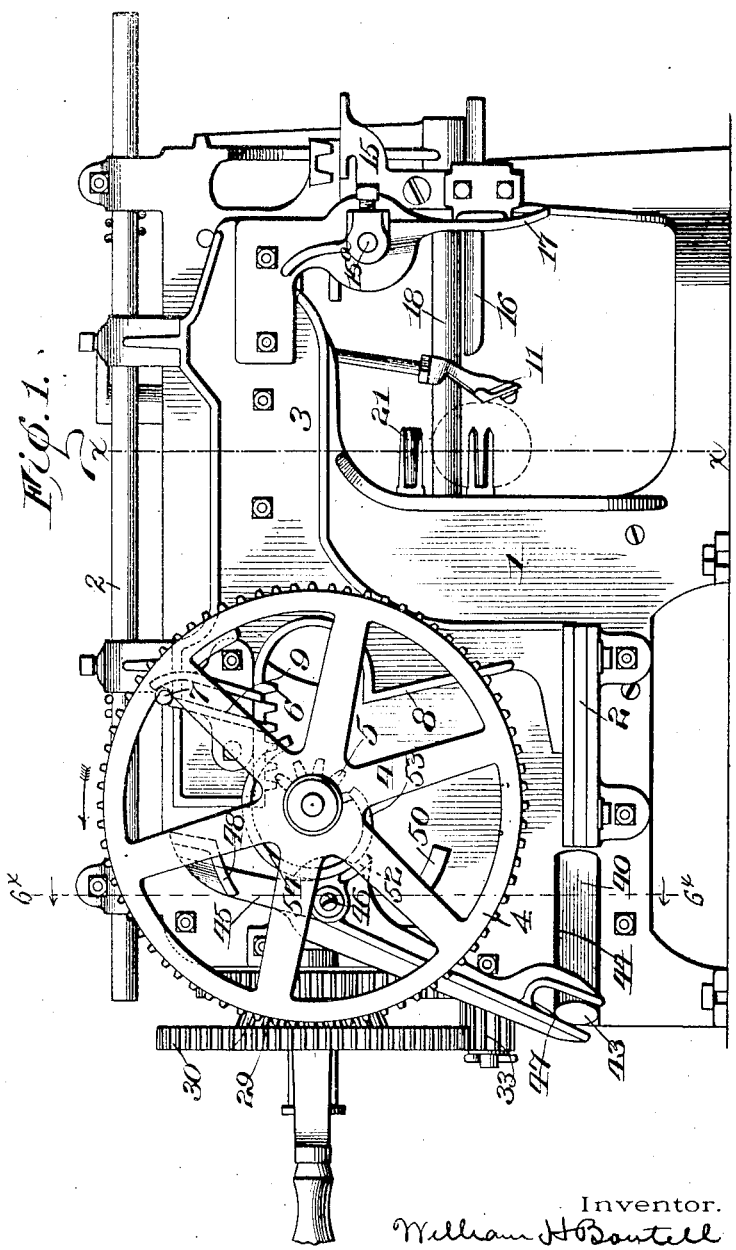

No. 892,394. PATENTED JULY 7, 1908.
W. H. BOUTELL.
FRUIT PARING MACHINE.
APPLICATION FILED MAY 17, 1901. RENEWED SEPT. 12, 1907.
5 SHEETS—SHEET 3.
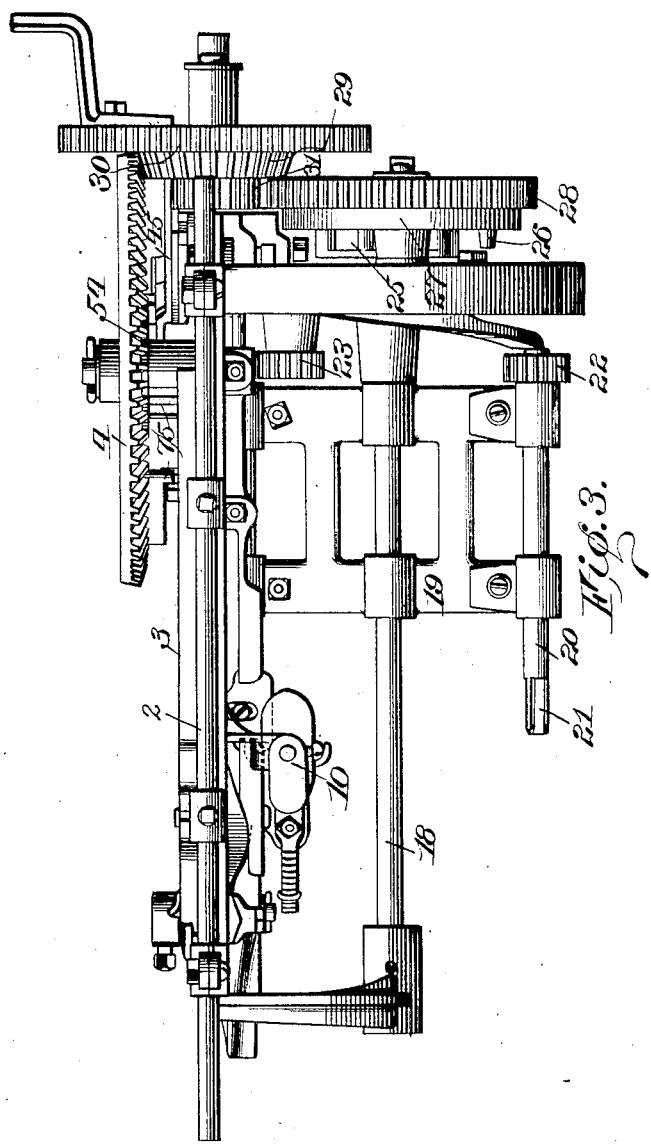
Witnesses.
Walker B. Payne.
Willard Rich.
Inventor.
William H. Boutell
Frederick Church
Attorney.

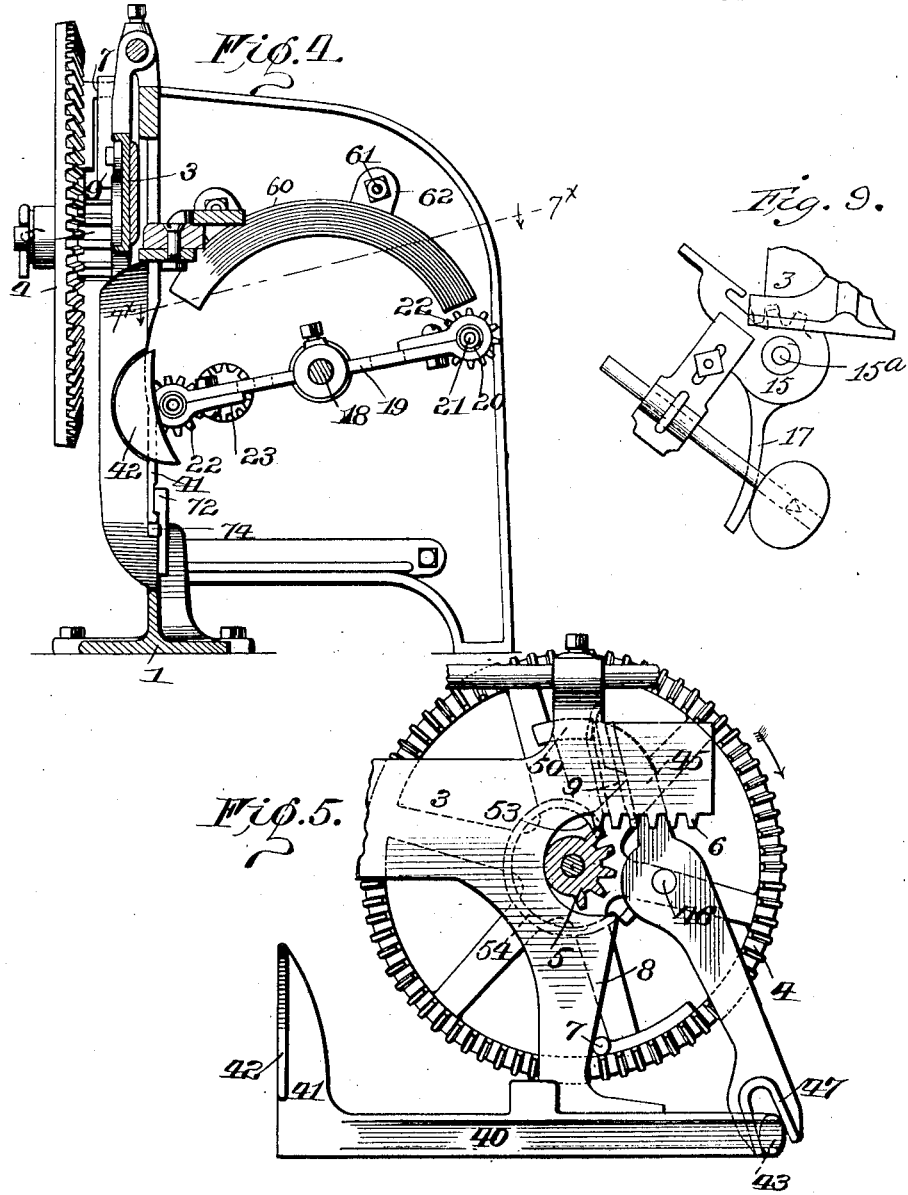

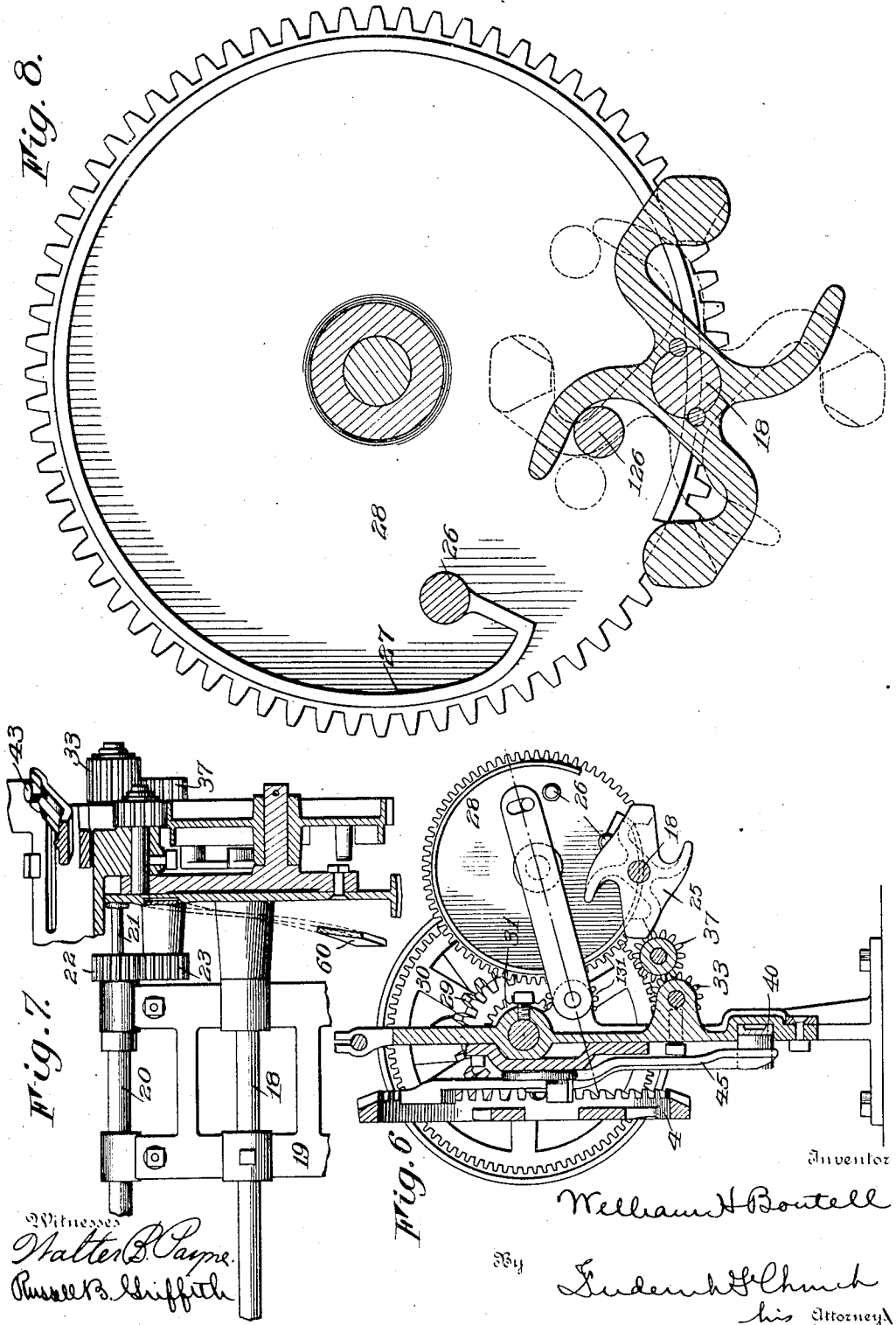

UNITED STATES PATENT OFFICE.

WILLIAM H. BOUTELL, OF ROCHESTER, NEW YORK, ASSIGNOR TO BOUTELL MANUFACTURING COMPANY, OF ROCHESTER, NEW YORK, A CORPORATION OF NEW YORK.

FRUIT-PARING MACHINE.

No. 892,394.  Specification of Letters Patent.  Patented July 7, 1908.

Application filed May 17, 1901, Serial No. 60,672. Renewed September 12, 1907. Serial No. 392,567.

*To all whom it may concern:*

Be it known that I, WILLIAM H. BOUTELL, of Rochester, in the county of Monroe and State of New York, have invented certain new and useful Improvements in Fruit-Paring Machines; and I do hereby declare the following to be a full, clear, and exact description of the same, reference being had to the accompanying drawings, forming a part of this specification, and to the reference-numerals marked thereon.

My present invention relates to apple paring machines, and particularly to that class known as power machines, and it has for its object to provide improved devices for doffing the fruit and cores, or either, from the fork after the paring operation.

To these and other ends the invention consists in certain improvements in construction and combination of parts, all as will be hereinafter described and the novel features pointed out in the claims at the end of this specification.

In the drawings: Figure 1, is a rear elevation of a paring machine embodying my invention. Fig. 2, is a front elevation thereof. Fig. 3, is a top plan view. Fig. 4, is a sectional view on the line $x$—$x$ of Fig. 1, and Fig. 5, is a detail view of the fruit doffer and the operating connections. Fig. 6 is a vertical sectional view on the line $6^\times 6^\times$ of Fig. 1. Fig. 7 is a detail sectional view on the line $7^\times 7^\times$ of Fig. 4. Fig. 8 is an enlarged view showing the operation of the reel head and the coöperating projections on the gear wheel for operating it taken on the line $8^\times 8^\times$ of Fig. 2. Fig. 9 is a detail view showing an impaling pin which may be employed in lieu of the corer blade. In this figure the revoluble head on which the pin or corer blade is mounted is shown tilted into which position it is adjusted to cause a fruit to be removed therefrom by the doffer.

Similar reference numerals in the several figures indicate similar parts.

In the present instance I have shown my invention applied to the general type of apple paring machines shown and described in an application filed by me June 4, 1900, Serial No. 19,032, and embodying the frame 1 having a guide 2 thereon on which is a carriage 3, reciprocated by a driving wheel 4 having a mutilated gear 5 coöperating with a rack 6 on the carriage, and also provided with a pin or stud 7 which engages alternately with flanges 8 and 9, on the carriage. The carriage is provided with a turntable 10 carrying the usual paring knife 11 which is adapted to be moved around the fruit as the carriage is reciprocated. Also mounted on the carriage is a head 15 pivoted at $15^a$ and carrying a part normally projecting substantially in line with the fork such as the corer blade 16, at one side of which is the stationary doffer 17.

Mounted upon a longitudinal shaft 18, journaled in the frame 1, is the fork reel 19 carrying the hollow fork shafts 20, provided with the core doffers 21, and having at their inner ends the pinions 22 adapted as the reel is revolved to be brought into mesh with the gear wheel 23 to cause the rotation of the fruit during the operation of the paring knife. The rotation of the reel is accomplished by means of a head 25, mounted on the shaft 18, having cam grooves and projections adapted to coöperate with projections 26 126, and a flange 27 on the gear wheel 28, whereby at each revolution of said wheel the fork reel will be revolved a one-half revolution as set forth in my previous application above referred to. The relative timing of the movement between the carriage and the rotating of the fork reel is accomplished by bevel gearing 29 upon the main driving gear wheel 30 which engages the wheel 4 and also by a pinion 31 on the said wheel meshing with an idler pinion 131 (Fig. 6) which coöperates with the gear wheel 28. A pinion 33 engaging the wheel 30 also meshes with a small gear wheel 37 secured to the arbor carrying the gear wheel 23 whereby the latter is driven continuously.

Slidably mounted on the frame 1 is a bar 40 having at one end a foot 41 carrying a flat pusher head 42 and at its opposite extremity provided with a lug or pin 43 extending to the rear of the frame and operating through a slot or aperture 44 therein. The doffer 42 pushes the fruit off the fork at the completion of the paring operation onto the corer blade and it is arranged opposite the center of the fork shaft and is curved on its forward edge to give a large bearing surface on the fruit and permit the free rotary movement of the fork reel. The bar carrying or constituting the pusher head, is removably mounted on the frame and is guided thereon between a shelf 70 and a lug 71 and its rearward movement is limited by a plate or finger 72 extending over the face of the bar near its forward end. The plate is secured by a single screw 73 and it is prevented from movement thereon by a projection or bar 74 on its inner face lying in a recess in the frame below the bar 40. The means by which the pusher is operated consists of an arm 45 pivoted at 46 having the jaw 47 at its lower end adapted to engage the pin 43, on the bar 40, and at its upper end provided with the flange 48. A lug or stud 50 on the wheel 4 is adapted to engage the flange to throw the pusher outward and it is returned to its normal position by means of a shoe 52 on the arm 45 which is engaged by the spiral or cam end 53 of a rim 54 on the wheel 4, the object of said rim being to bear against the shoe 52 and prevent the accidental outward movement of the fruit pusher during the paring operation, but having its end so arranged that it passes off the shoe and releases the arm 45 just as the stud 50 engages the flange 48.

The end 53 of the cam ring is located in such a position on the wheel 4 that it engages the shoe 52 at such a time relatively to the movement of the reel that the pusher is returned before the other fork of the reel is rotated into operative position.

In this type of paring machine, in which the paring knife 11 is moved in a longitudinal direction relatively to the fruit forks, a distinct advantage is obtained by employing a pusher which discharges the fruit after the paring operation is completed. At the completion of the paring operation the knife is in rear of the fruit and upon the return movement of the carriage 3 it is rotated laterally away from and subsequently moved toward the fork by the turntable 10 in passing again to its normal position, as shown in full lines in Fig 2. The carriage of the machine reciprocates with considerable rapidity, and the reversal in its direction of movement frequently imparts to a pared fruit a tendency to move outwardly toward the end of the corer blade 16, or impaling pin, so that it would lie in the path of the paring knife and be engaged thereby, the result being that either the knife supporting arm would be bent, or the fruit broken, or both. This inconvenience may occur from other causes, for instance a fruit having a pithy center may adhere to the fork and fail to be removed wholly therefrom when impaled by the corer blade, or pin, and retracted out of the path of the paring knife. It will be noticed that the devices which effect the movement of the pusher or doffer 42 are timed relatively to the movement of the paring knife so that the pared fruit is positively discharged from the fork in advance of the knife and it is impossible for the latter to engage it, thus preventing injury either to the knife or fruit.

By employing a device for removing the fruit from the fork after the paring operation I am enabled to employ a semicircular coring knife 16 as shown, in instances when the fruit is to be cored but if it is not to be so prepared a single pin, sharpened at its forward end and arranged to move centrally of the forks, may be substituted for the knife and the fruit impaled thereon when removed from the fork and the fruit will be subsequently removed from the pin by the doffer arm 17 in the usual manner when the corer is tilted downwardly on the pivot 15$^a$. In the former case when the core is removed from the fruit it remains between the fork tines and as it must be removed before the next fruit is applied I have provided the core doffers 21 movable longitudinally in the hollow fork shafts 20. Arranged above the shaft 18 and concentric therewith is a circular cam 60 located in the path of the doffers 21 and adapted to move them outwardly to eject the core as the forks are successively revolved into position for a new fruit, the application of which returns the doffer to its normal position. The cam is a simple arrangement for operating the core doffers and may be made as a separate part and easily applied to any multiple fork machine by suitable attaching devices and in the present instance I have employed bolts 61 passing through the frame and engaging ears 62 on the cam.

The positive ejection of the pared fruit by the pusher 42 occurs after the paring operation at the rear side of the machine and when the fruit is cored, by a blade such as 16, the core remains between the tines of the fork and is not discharged until the reel is rotated a half revolution when the cam 60 ejects the core doffer 21, the fruit fork then being at the front side of the machine. This arrangement of the parts enables the pared fruit to be collected in one receptacle, or deposited upon a conveyer, and the cores to be collected in another receptacle, which greatly facilitates the subsequent handling of the fruit.

Paring machines embodying the above devices are capable of operating upon either cored or uncored fruit.

The construction I have described is simple and the relative timing of the operation of the various parts is so arranged that the fruit can be operated upon as rapidly as it can be placed by the operator upon the forks.

I claim as my invention:

1. In a fruit paring machine, the combination with a frame and a rotary fruit fork thereon, a reciprocatory carriage on the frame and a fruit paring knife mounted on the carriage, of a fruit pusher sliding longitudinally on the frame, means for reciprocating the carriage and a device for actuating the pusher operated by said means for causing a forward and rearward movement of the pusher relatively to the movement of the carriage.

2. In a fruit paring machine, the combination with a frame and a reel thereon having a plurality of fruit forks, a reciprocatory carriage on the frame and a fruit paring knife mounted thereon, of a reciprocatory device mounted on the frame for removing the fruit from the forks, operating devices for revolving the fork reel and means actuated by said devices for causing a relative forward and rearward reciprocatory movement of both the carriage and fruit pusher.

3. In a paring machine, the combination with a frame, a reciprocatory carriage thereon, a fruit paring knife mounted on the carriage, and a fruit fork, of a reciprocatory fruit pusher guided on the frame and separate from the fork, and an actuating device for the pusher, a driving wheel, connections between it and the carriage and separate connections between the wheel and actuating device for causing a forward and rearward reciprocatory movement of the pusher relatively to the movement of the carriage.

4. In a paring machine, the combination with a frame having a movable carriage provided with a paring knife, and a fruit fork, of a wheel for reciprocating the carriage, a fruit pusher mounted on the frame and separate from the fork, a pivoted operating lever connected thereto, and devices on the wheel engaging the lever to lock the pusher in retracted position during the paring operation and to move it past the fork after the completion of said operation.

5. The combination with a frame having the carriage provided with the paring knife, a reel having a plurality of fruit forks thereon, an operating wheel for reciprocating the carriage, and means connected therewith for rotating the reel, of a bar slidably mounted on the frame having at its outer end a portion adapted to lie in rear of the fruit fork, a lever engaging the rear end of the bar, and operating connections between the lever and wheel.

6. The combination with a frame, the movable carriage having the paring knife, a fruit fork, and a wheel for reciprocating the carriage, of guides on the frame, a bar mounted therein, and a single retaining device holding the bar in the guides, a lever engaging the end of the bar, a lug on the wheel engaging the lever to move the bar outwardly and a flange on the wheel having the spiral end engaging the lever on the opposite side of its pivot to return the bar and lock it in its normal position during the paring operation.

7. The combination with a paring machine embodying a frame, a fruit fork thereon, a carriage and an operating wheel for reciprocating the carriage, of guides on the frame, a bar mounted in the guides having at one end a flange arranged proximate to the fruit fork and lying in rear thereof, and a pivoted operating lever connected to the opposite end of the bar, projections on the wheel operating against the lever on opposite sides of its pivot to reciprocate the bar, a finger engaging the face of the bar to hold it in engagement with the guides and having a projection engaging a recess in the frame, and a single fastening device securing the finger to the frame.

8. In a paring machine, the combination with a rotary fork shaft, a paring knife movable longitudinally of the shaft at one side thereof, and a fruit receiver arranged substantially in line with the fork and adapted to tilt in a vertical plane, of a pusher operating on the main frame separate from and in rear of the fork to force the fruit from the latter onto the receiver after the completion of the paring operation and a doffer for stripping it from the receiver by the tilting of the latter.

9. In a paring machine, the combination with a reel having a plurality of rotary forks thereon each having a core doffer, a paring knife movable longitudinally of the fork on one side thereof and a movable fruit receiver arranged substantially in line with the fork when in operative position, of a reciprocating pusher on the frame separate from and in rear of a fork, when in operative position, to force the fruit from the latter onto the receiver after the completion of the paring operation, means for removing the fruit from the receiver, and a stationary cam for operating the core doffers during the rotation of the reel.

10. In a paring machine, the combination with a frame, a fruit fork thereon, a paring knife adapted to coöperate with a fruit on the fork, and a reciprocatory fruit receiver mounted on the carriage, of a reciprocatory pusher sliding on the frame and adapted to engage a fruit on the fork and relatively timed operating devices for moving the receiver toward and from the fruit fork and to actuate the pusher outwardly past the fork during the movement of the receiver away from the fork and to subsequently return said pusher to its normal position.

11. In a paring machine, the combination with a reel having a plurality of fruit forks thereon, each having a core doffer and a paring knife movable longitudinally of the fork and a movable core cutter coöperating with the fruit on the forks, of a reciprocatory pusher, means for operating it to force the fruit from the fork after the completion of the paring operation, and a stationary cam coöperating with the core doffers, and during the rotation of the reel to eject the cores from the forks after the fruit has been removed therefrom.

12. In a fruit paring machine, the combination with a frame, a reel mounted thereon having a plurality of fruit forks, a reciprocatory carriage on the frame having a turntable, a paring knife mounted on the turntable and means for rotating the latter during the reciprocatory movement of the carriage to swing the knife around a fruit on one of the forks as it is carried forward by the movement of the carriage in one direction, of a fruit pusher independent of the fruit forks, operating devices for intermittently revolving the fork reel and means actuated thereby for reciprocating the carriage and causing a forward movement of the pusher at the completion of the paring operation and during the rearward movement of the carriage to discharge a fruit in advance of the returning knife, said means also operating to restore the pusher to its normal position prior to the rotation of the reel.

WILLIAM H. BOUTELL.

Witnesses:
G. WILLARD RICH,
ELIZABETH J. PERRY.